US008810986B2

(12) United States Patent
Jarman

(10) Patent No.: US 8,810,986 B2
(45) Date of Patent: Aug. 19, 2014

(54) CIRCUIT BREAKER

(75) Inventor: Timothy Rupert Charles Jarman, Farnborough (GB)

(73) Assignee: Qinetiq Limited, London (GB)

( * ) Notice: Subject to any disclaimer, the term of this patent is extended or adjusted under 35 U.S.C. 154(b) by 728 days.

(21) Appl. No.: 12/999,881

(22) PCT Filed: Jul. 1, 2009

(86) PCT No.: PCT/GB2009/001650
§ 371 (c)(1),
(2), (4) Date: Dec. 17, 2010

(87) PCT Pub. No.: WO2010/004260
PCT Pub. Date: Jan. 14, 2010

(65) Prior Publication Data
US 2011/0085274 A1    Apr. 14, 2011

(30) Foreign Application Priority Data

Jul. 5, 2008   (GB) .................................. 0812335.8

(51) Int. Cl.
*H02H 3/06* (2006.01)
(52) U.S. Cl.
USPC .............. 361/115; 361/94; 307/126; 307/140
(58) Field of Classification Search
USPC .............................. 361/115, 94; 307/126, 140
See application file for complete search history.

(56) References Cited

U.S. PATENT DOCUMENTS

| | | | | |
|---|---|---|---|---|
| 4,412,267 A * | 10/1983 | Hansen | ............................ | 361/94 |
| 4,789,848 A * | 12/1988 | Castonguay et al. | ......... | 335/167 |
| 4,860,157 A * | 8/1989 | Russell | .......................... | 361/156 |
| 5,091,664 A * | 2/1992 | Furuhata | ........................ | 327/574 |
| 5,994,790 A * | 11/1999 | Nagashima et al. | ......... | 307/10.1 |
| 6,628,495 B2 * | 9/2003 | Gerfast | .......................... | 361/115 |
| 6,972,937 B1 | 12/2005 | Macbeth et al. | | |
| 7,157,813 B2 * | 1/2007 | Djenguerian et al. | ........ | 307/130 |
| 2005/0135034 A1* | 6/2005 | Johnson et al. | .............. | 361/93.1 |
| 2008/0180866 A1* | 7/2008 | Wong | ............................. | 361/45 |

FOREIGN PATENT DOCUMENTS

| | | |
|---|---|---|
| EP | 0 300 078 A1 | 1/1989 |
| EP | 1 150 410 A2 | 10/2001 |
| EP | 1 598 912 A2 | 11/2005 |
| GB | 2 152 305 A | 7/1985 |

OTHER PUBLICATIONS

International Search Report for International Patent Application No. PCT/GB2009/001650, mailed on Oct. 20, 2009.
Written Opinion for International Patent Application No. PCT/GB2009/001650, mailed on Oct. 20, 2009.
British Search Report for corresponding British Patent Application No. 0812335.8, dated Oct. 16, 2008.

(Continued)

*Primary Examiner* — Marc Armand
(74) *Attorney, Agent, or Firm* — Oliff PLC

(57) ABSTRACT

An electronic circuit breaker including a two stage detection mechanism; an instantaneous trip operating at a first threshold and a delayed trip such operating at a second lower threshold. This is advantageous in maintaining operation during very short transient load peaks, which do not warrant isolation from the supply. The breaker can be line powered, can be reset remotely by controlling the line power, and can be implemented entirely in solid state electronics. As such it requires little or no service or maintenance.

11 Claims, 3 Drawing Sheets

(56) References Cited

OTHER PUBLICATIONS

Jan. 5, 2011 International Preliminary Report on Patentability issued in International Patent Application No. PCT/GB2009/001650.

Feb. 20, 2012 Examination Report issued in British Application No. GB1021403.9.

Sep. 6, 2012 Examination Report issued in British Application No. GB1021403.9.

* cited by examiner

CIRCUIT BREAKER

The present invention relates to protection of components from excessive currents, and in particular to circuit breakers.

In order to protect electrical equipment from overcurrent, fuses or circuit breakers are frequently employed to interrupt power supply to that equipment should too much current be drawn. This serves to isolate the equipment and to protect components from damage.

Conventional fuses are widespread, and include a conducting wire or strip which melts when subjected to too much current, thus breaking the circuit. Such fuses are cheap and the thermal mechanism and thermal inertia of the fuse result in surprisingly useful breaking characteristics in practice. A principal disadvantage however is that once blown, a fuse must be replaced to re-establish power to equipment.

Circuit breakers are re-settable switches designed to act in a similar fashion to conventional fuses. A common construction is a magnetic circuit breaker which uses a solenoid as an actuation element, but careful design is required to ensure reliable operation of moving parts.

An electronic fuse or circuit breaker has been proposed to dispense with moving parts. US 2005/0135034 and U.S. Pat. No. 6,628,495 for example both illustrate electronic arrangements to interrupt power supply under overload conditions.

It is an object of the present invention to provide an improved circuit breaking device.

According to a first aspect of the invention there is provided an electronic circuit breaker comprising a current sensor for monitoring the current in a line and outputting a signal representative of said current; control circuitry for receiving and processing said signal to detect a fault condition; and a switching element for interrupting the current in the line on detection of a fault condition by said control circuitry; wherein said control circuitry includes two stage detection such that a fault condition results if said current signal exceeds a first current threshold for a predetermined time period, or if said current exceeds a second threshold, greater than said first threshold.

The electronic circuit breaker provided by this aspect of the invention provides a two tier breaking condition. A first threshold current is subject to a delay timer such that the sensed current must exceed the threshold value for an extended duration before the device trips. This can be provided by a delay element, such as a capacitor, in the control circuitry. The period can be selected as appropriate by a user. This is advantageous in maintaining operation during very short transient load peaks, which would otherwise trip the device, but can be safely sustained by the load and do not warrant isolation from the supply and subsequent resetting. A common example of such transients are inrush currents experienced on start up.

A second stage of current detection, with a second threshold allows higher currents to trip the device without delay. While smaller transients above the first threshold and up to a certain time duration are tolerated, current values above the second threshold, even if less than that certain time duration, cause the device to trip substantially instantaneously.

In this way, the benefits of an electronic circuit breaker are maintained while the advantageous characteristics of a simple fuse are more closely approximated.

Both instant and delayed threshold currents can be user defined, and a range of preset values may be provided for selection by a user.

Embodiments of the invention are conveniently line powered, that is the power required to operate the breaking device is drawn from the current carrying line on which the device operates. This offers the advantage that a separate power source is not required.

The breaker will be arranged to latch on operation in most embodiments. In this way, once tripped, the breaker remains in the 'open' state until reset. Advantageously, embodiments of the present invention can be reset by removing and then reapplying power to the line. By enabling the device to be reset by a short power interruption to the line, the device can be reset remotely.

Embodiments of the invention can be implemented entirely in solid state electronics, ie having no mechanical action or moving parts, and can offer the advantages of:
consistent operation over extended periods
precisely defined breaking current(s)
automatic reset which can be remotely operated
no moving parts
user-definable breaking current(s)

The invention extends to methods, apparatus and/or use substantially as herein described with reference to the accompanying drawings. A method of monitoring a current carrying line may be provided independently, the method comprising obtaining a value for the current in the line; defining a first current value threshold, a second, higher, current value threshold and a delay period; comparing the obtained value with said thresholds to detect an overload condition, applying said second threshold always and applying said first threshold only for overloads having a duration greater than said delay period; and interrupting said current if an applied threshold is exceeded.

A rapidly fluctuating current value which repeatedly crosses the first, lower, threshold can—for the purposes of this specification—be considered as a single overload instance having a duration greater than the time between individual crossings. This will be understood by the skilled person who would clearly appreciate that in the method and apparatus described above, interruption can be caused by a number of brief overloads at the first threshold occurring in sufficiently rapid succession, and that an inertial effect is provided.

Any feature in one aspect of the invention may be applied to other aspects of the invention, in any appropriate combination. In particular, method aspects may be applied to apparatus aspects, and vice versa.

Furthermore, features implemented in hardware may generally be implemented in software, and vice versa. Any reference to software and hardware features herein should be construed accordingly.

Preferred features of the present invention will now be described, purely by way of example, with reference to the accompanying drawings, in which.

Figure 1:
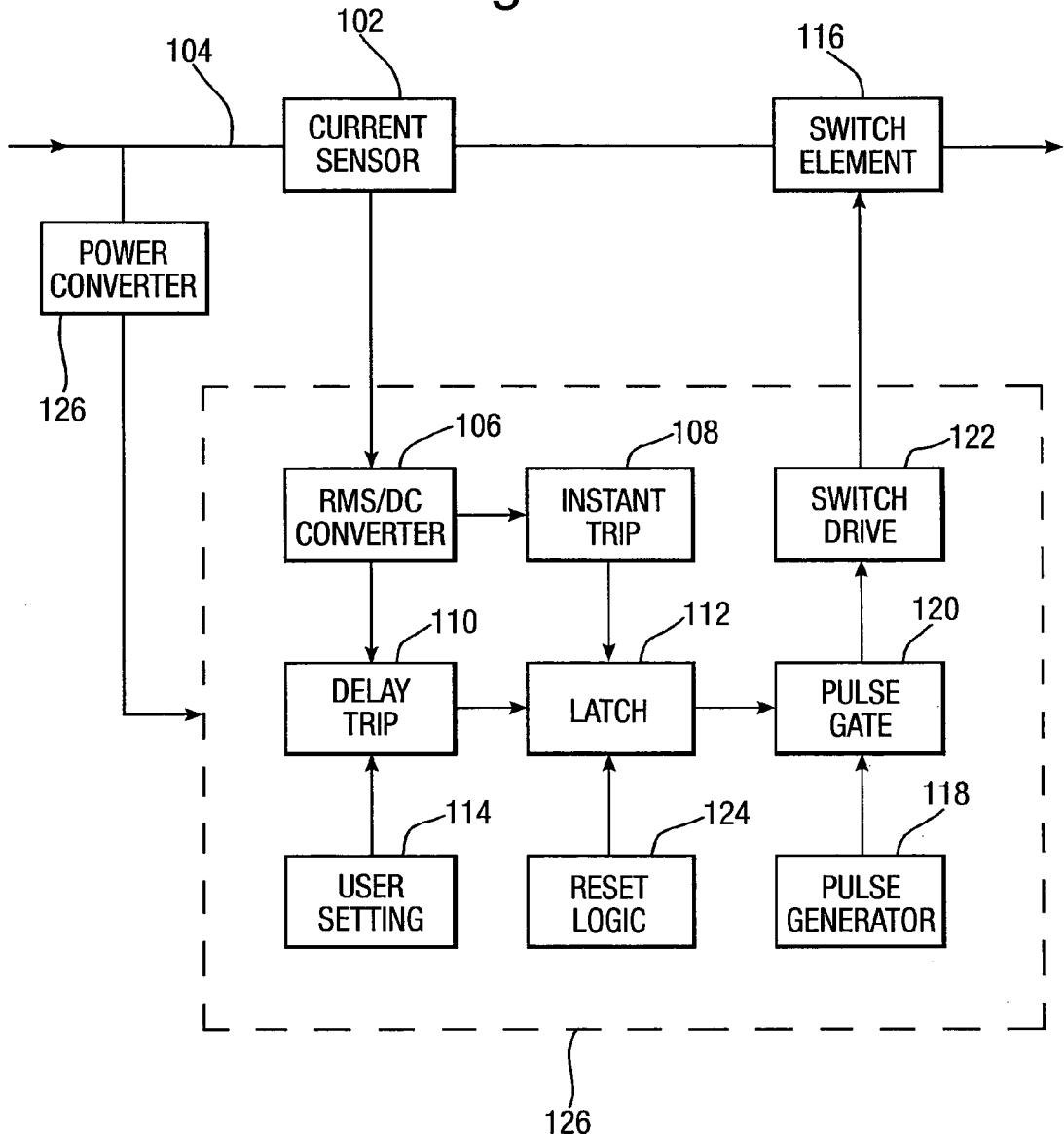
FIG. 1 is a schematic block diagram of a circuit breaker according to the present invention.

Referring to FIG. 1 current sensor 102 senses the current in an AC supply line 104. In the example of FIG. 1 a hall sensor is used however other methods such as a sensing resistor or a sensing transformer could also be employed. Although considerably more expensive and complex than the other two methods the hall current sensor offers high levels of accuracy and stability, is sensitive to both the AC and DC content of the measured current, has a fast response time and most importantly does not require a resistive or inductive element to be placed in series with the current carrying conductor. Complete assemblies which also contain the first stages of signal conditioning circuitry are readily available that simply require the current carrying conductor to be passed through a hole in the housing. Once power is supplied, a current output results that is proportional to the current in the measured circuit (usually at a 1000:1 ratio or 1 mA/A). This type of sensor also offers complete isolation between the current carrying conductor and the measuring terminals. As the measured current does not pass directly through any part of the sensor, it is very rugged and cannot be damaged by overload. It is thus possible to scale the output of the sensor to give good accuracy and resolution at normal currents without incurring problems under a fault condition or a switch-on surge.

The output signal from the current sensor is passed to converter 106 which takes the AC component of the signal (assuming AC current is being measured) and rectifies it to provide a DC value indicative of the RMS current in the line. The signal may be amplified to bring it to an appropriate level. The rectified signal may be filtered to remove spikes and transients, and is passed to two trip stages in parallel; instant trip 108 and delay trip 110.

Instant trip 108 compares the value of the sensed current with a predetermined threshold, which in this example is 12 A, although higher values such as 25 A may be appropriate in certain circumstances. Any sensed value exceeding the 12 A threshold results causes the instant trip stage to set the one shot latch 112, which causes the current in the line to be interrupted as will be explained below. The instant trip can be implemented for example by a comparator having a reference voltage at one input.

In parallel with the instant trip, delay trip 110 also provides a condition on the sensed current value which results in setting of latch 112 and hence interruption of current in the line. Again the sensed value is compared to a reference, however the output of the trip includes a delay stage, such that the latch is not set instantaneously upon the sensed value exceeding the threshold. Instead, the sensed value must exceed the threshold for a set period of time before a signal is output to set the latch. The threshold value can be selected by a jumper link at stage 114 from a number of possible values (in this case 1 A, 2 A or 4 A).

Switch element 116 comprises a pair of thyristors connected in anti-parallel in series with the AC supply. Connections are made between their gate and cathode terminals to which the driving pulses are applied. Other components could be considered, including various types of transistors and magnetic relays, however electronic switching components are preferred, since if suitably rated then the circuit is broken cleanly and efficiently and can be re-made to the original standard as many times as is required. The limitations that relays impose, such as the risk of mechanical failure, slow operation, contact "bounce" and the risk of contaminated or burned contacts can therefore be avoided.

The thyristor is in simple terms a diode that does not conduct in the forward direction until it is triggered. It then conducts (and cannot be turned off) until the current passing through it ceases. The degree of "latching" action thyristors exhibit is in part governed by the current passing through them. This has the useful effect of protecting the device against surges of current which tend to turn it on "harder", preventing a substantial rise in dissipation.

Under normal operation, a pulse generator 118 produces an oscillating drive signal at approximately 6 kHz, which passes through pulse gate 120 (under non-fault conditions) to the switch drive 122. The switch drive amplifies the pulse power to a sufficient level to pass cleanly through a pair of small isolating transformers to the thyristors. This triggers the thyristor's conducting state over 50 times each half cycle (50 Hz). The isolation transformers effectively block the high common-mode voltage and so the need for complex "level shifting" circuits is avoided.

When the latch is set however, it causes the pulse gate to block the pulse signal to the switch drive. The thyristors can continue to conduct for the remaining portion of the cycle, but at the next zero crossing point, and with no trigger signal being applied to their gates, the thyristors cease to conduct, interrupting the current in the line. The maximum period of conduction following activation by the latch is therefore approximately half a cycle, or 10 milliseconds for standard 50 Hz supplies.

Latch 112 is used to ensure that once tripped, the device remains latched 'on' and maintains the switch element in a non-conductive state. The 'on' open-circuit impedance is in excess of 100K ohms. Reset logic 124 is provided in order to reset the latch and allow the switch element to conduct once more. In this example the reset logic has no dedicated external input, and is controlled by the state of the line 104. Reset logic 124 is arranged such that a reset pulse is produced for a short period of time following power up, after power to the device has been removed or interrupted. Since the device of FIG. 1 is line powered (explained in greater detail below) removal and reapplication of power to the main line causes the latch of the breaker to be reset to the 'off' position (switch element in conducting state).

The breaker takes power from the line 104 being monitored, via power converter 126 but draws a minimal current, the power requirement being less than 3 W. The line voltage may vary across a wide range however, and in the present example may vary between 240V and 1000V, a ratio of roughly 4:1. Typically a stable 12V is required for the control electronics. In the case of an AC line, a step down transformer is employed, followed by a power regulation stage. Power regulation may be achieved by a linear converter with sufficient head room to handle the large input voltage range. Alternatively a switch mode power supply (SMPS) could be used.

In the example of FIG. 1, linear regulation is used sequentially in combination with an SMPS. If the output from the transformer is has a 60V maximum, then an SMPS is arranged to operate at up to 30V input, with substantially no voltage dropped across the linear stage. Above 30V input the linear stage comes into operation, dissipating power to maintain 30V to the SMPS. Such an arrangement is capable of handling inputs having a maximum to minimum ratio of 6:1 and providing a stable output from which reference thresholds can be determined.

It is noted that components within dashed line 126 are isolated from the line voltage at the power converter through the step down transformer, and at the switch element by the pair of isolating drive transformers. It is noted that a hall current sensor operates by the detection of electromagnetic fields surrounding a current carrying conductor, and provides inherent isolation. Thus the control circuitry is completely isolated from the line.

The example of FIG. 1 is particularly suited for subsea applications, typically used to protect supply lines to underwater equipment in oil rigs for example. The device can be implemented entirely using solid state electronics by standard components proven to have extremely high reliability and long life, and packaged in a suitable waterproof housing. This is important as little or no possibility exists for servicing or maintenance—service life can be in excess of 30 years. The unit does not need to be accessed for resetting as this is performed remotely by interruption of power to the line.

Figure 2:
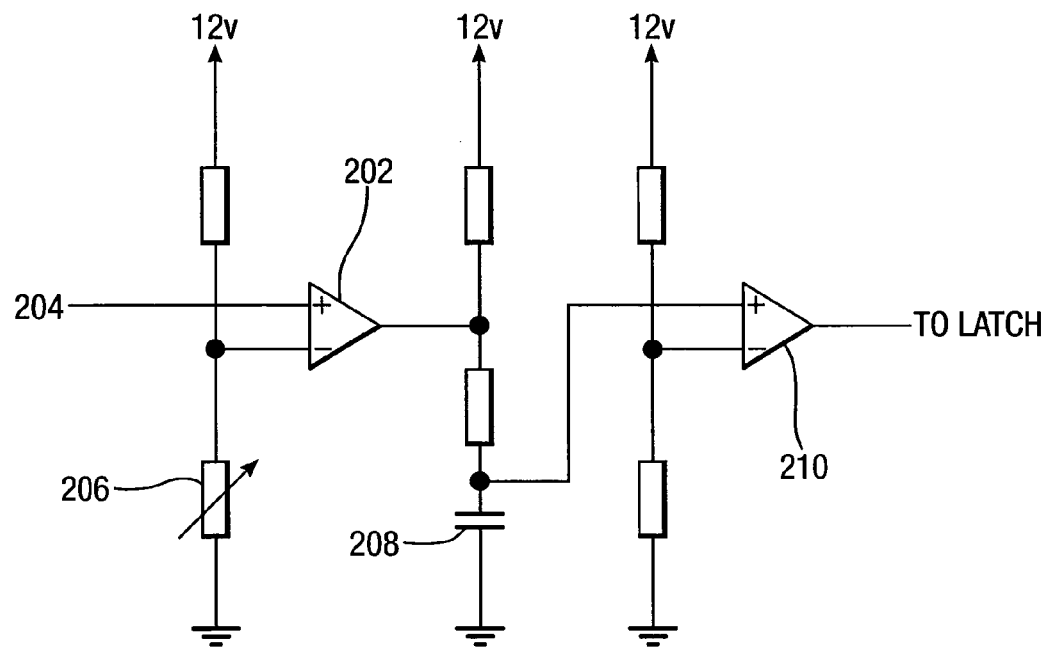
FIG. 2 illustrates elements of a delayed threshold circuit.

FIG. 2 illustrates how the delay trip could be realised using a capacitor circuit. A first comparator 202 compares the sensed current value 204 with a reference value set by a potential divider operating off a stable 12 v supply. The reference may be adjusted by means of varying the value of resistor 206. The output is connected via a capacitor 208 to the input of a second comparator 210. A potential divider operating off the supply voltage again provides a reference for the second comparator. Only once the capacitor is charged to a sufficient voltage is the output to set the latch produced. The circuit is preferably arranged so that residual voltage across the capacitor decays faster than it can accumulate.

In this way, single peak loadings of less than a specified delay are not responded to. If however a larger number of brief overloads occur in rapid succession then the trip does operate. This action mimics the characteristics of a traditional wire fuse, in providing a degree of inertia in the breaking characteristic. In the present example, a sensed current value exceeding the threshold must be essentially maintained for approximately 160 milliseconds to trigger the latch (assuming the sensed current value does not exceed the instant trip threshold).

Figure 3:
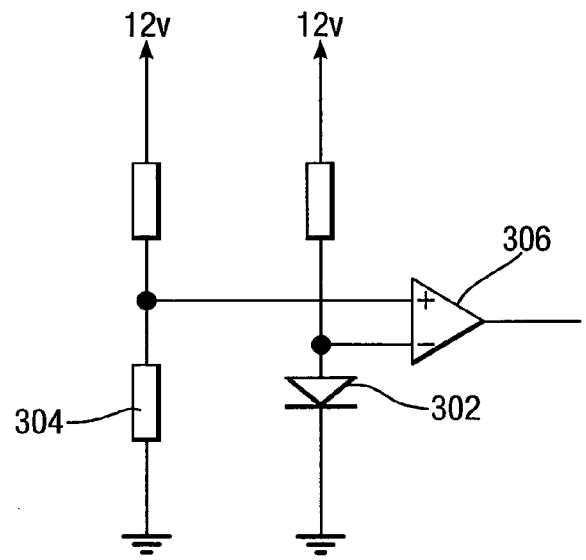
FIG. 3 illustrates elements of a reset circuit.
Figure 4:
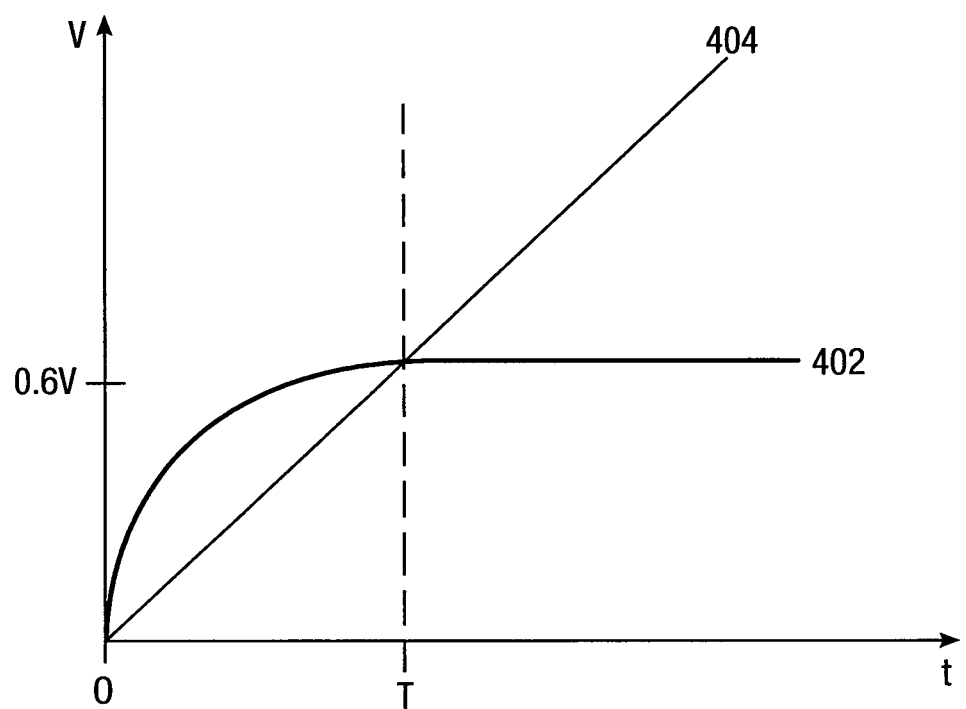
FIG. 4 illustrates a graph representing the voltage across the diode and the resistor when the 12v supply voltage of FIG. 3 is reapplied after interruption.

FIG. 3 illustrates reset logic which produces a reset pulse for a short period after the supply voltage is initiated. Trace 402 of FIG. 4 illustrates the voltage across diode 302, and trace 404 illustrates the voltage across resistor 304 when the 12v supply voltage of FIG. 3 is reapplied after interruption. The diode voltage increases non-linearly up to its steady state value of approximately 0.6V. It can be seen that during the period up to T, the diode voltage is the greater of the two, and the output of comparator 306 is held low. At all times after T (assuming constant supply voltage) the diode voltage is less than that provided by the resistor divider, and the comparator output is high. The short low pulse can be used to reset the latch on start up, and is reliable even for a very gradually increasing supply voltage.

The example of FIG. 1 shows a device for protecting an AC supply line, however the invention is equally applicable to DC lines.

For example, in place of thyristors, Insulated Gate Bipolar Transistors (IGBTs) could be used with the addition of suitable protection circuitry and modified elements for driving circuitry between the one-shot latch and the switching element.

A hall current sensor responds down to DC so could remain, but no rectification of the current signal would be necessary. Tripping latching and resetting elements could all remain essentially unchanged also.

The other important change is that a transformer could not be employed for DC power conversion, and a modified SMPS is a viable alternative.

It will be understood that the present invention has been described above purely by way of example, and modification of detail can be made within the scope of the invention.

Each feature disclosed in the description, and (where appropriate) the claims and drawings may be provided independently or in any appropriate combination.

The invention claimed is:

1. An electronic circuit breaker comprising:
   a current sensor for monitoring the current in a line and outputting a signal representative of said current;
   control circuitry for receiving and processing said signal to detect a fault condition if said current signal exceeds a first current threshold for a predetermined time period, or if said current exceeds a second threshold, greater than said first threshold;
   a latch which latches on detection of a fault condition; and
   a switching element controlled by said latch for interrupting the current in the line on detection of a fault condition by said control circuitry,
   wherein the latch is reset by removing and reapplying power to said line.

2. A circuit breaker according to Claim 1 wherein the breaker is powered from said line.

3. A circuit breaker according to claim 1, wherein resetting of the breaker is controlled by the voltage established across a diode.

4. A circuit breaker according to claim 1, wherein current in the line is DC.

5. A circuit breaker according to claim 1, wherein current in the line is AC.

6. A circuit breaker according to claim 1, wherein the line voltage is greater than 250V.

7. A circuit breaker according to claim 1, wherein the line voltage is greater than 1000V.

8. A circuit breaker according to claim 1, implemented entirely in solid state electronics.

9. A circuit breaker according to claim 4, wherein said switching element comprises at least one insulated gate bipolar transistor (IGBT).

10. A circuit breaker according to claim 5, wherein said switching element comprises at least one thyristor.

11. A method of monitoring a current carrying line comprising
   obtaining a value for the current in the line;
   establishing a first current value threshold, a second, higher, current value threshold and a delay period;
   comparing the obtained value with said thresholds to detect an overload condition, applying said second threshold always and applying said first threshold only for overloads having a duration greater than said delay period; and
   if an applied threshold exceeded, operating a latch to interrupt said current, and resetting said latch by removing and reapplying power to said line.

* * * * *